United States Patent [19]
Briggs et al.

[11] Patent Number: 5,106,182
[45] Date of Patent: Apr. 21, 1992

[54] LAMINATED COSMETIC CONTACT LENS AND METHOD OF MAKING SAME

[76] Inventors: Charles R. Briggs, 6815 Academy Pkwy. West, N.E., Albuquerque, N. Mex. 87109; Charles W. Neefe, 811 Scurry St.; Barbara Smith, 1019 Stadium St., both of Big Spring, Tex. 79721

[21] Appl. No.: 588,464

[22] Filed: Sep. 24, 1990

Related U.S. Application Data

[63] Continuation-in-part of Ser. No. 501,891, Feb. 12, 1990, abandoned, which is a continuation-in-part of Ser. No. 231,678, Aug. 11, 1988, Pat. No. 4,903,052, which is a continuation-in-part of Ser. No. 211,335, Jun. 24, 1988, Pat. No. 4,840,477, which is a continuation-in-part of Ser. No. 869,583, Jun. 2, 1986, Pat. No. 4,738,520, which is a continuation-in-part of Ser. No. 832,381, Feb. 24, 1986, abandoned.

[51] Int. Cl.⁵ .............................................. G02C 7/04
[52] U.S. Cl. ................................... 351/162; 351/177
[58] Field of Search ............... 351/160 R, 160 H, 161, 351/162, 177

[56] References Cited

U.S. PATENT DOCUMENTS 4,704,017  11/1987  Knapp ............................ 351/162 X
4,720,188  1/1988   Knapp ............................ 351/177

Primary Examiner—Scott J. Sugarman

[57] ABSTRACT

The invention is a method of printing a replica of the natural iris on a contact lens. The printing is done using a rubber printing member having up raised rubber radial segments having a radius of substantially the same as the contact lens. The printing ink is applied to the radial printing segments and the rubber stamp is applied to the lens. Pressure is then applied to the rubber stamp forcing the edges of the radial printing segments to move outward moving an amount of printing ink ahead of the advancing edge. The lens is rotated and the process is repeated forming a geometric pattern resembling the human iris.

4 Claims, 2 Drawing Sheets

LAMINATED COSMETIC CONTACT LENS AND METHOD OF MAKING SAME

This is a continuation in part of application Ser. No. 07/501,891 filed Feb. 12, 1990 by Charles W. Neefe entitled "A METHOD OF DARKENING OR LIGHTENING THE APPARENT COLOR OF THE EYE" now abandoned which is a continuation in part of Ser. No. 231,678 (now U.S. Pat. No. 4,903,052) filed Aug. 11, 1988 by Charles W. Neefe entitled "METHOD OF MAKING AN IMPROVED DYED COLOR CHHANGE CONTACT LENS"; which is a continuation in part of application Ser. No. 211,355 (now U.S. Pat. No. 4,840,477) filed Jun. 24, 1988 by Charles W. Neefe entitled "DYED COLOR CHANGE CONTACT LENS"; which is a continuation in part of application Ser. No. 869,583 (now U.S. Pat. No. 4,738,520) entitled "EYE COLOR CHANGE CONTACT LENS" filed Jun. 2, 1986; which is a continuation in part of application Ser. No. 832,381 entitled "EYE COLOR CHANGE CONTACT LENS BLANK" filed Feb. 24, 1986 by Charles W. Neefe, now abandoned.

The desire to change and enhance the apparent eye color of the eye was recorded by the Egyptians five thousand years ago. Cosmetic makeup for the eye area accounts for the larger percentage of the cosmetic sales today.

It is well known that a transparent colored contact lens will not change the color of a dark brown eye.

Several contact lenses have been produced in an effort to achieve cosmetic eye color change of a dark eye.

one attempt employed a laminated structure with a painted opaque plastic member. The result was a thick heavy lens which was difficult to fabricate and difficult to wear. A later attempt employed a colored opaque plastic porous member surrounding a clear cylinder from which the lens was cut by lathing. This resulted in a lens having a pupil and iris pattern and the porous member had tendencies to flake and chip at the edge. See U.S. Pat. No. 3,454,332 to Siegel.

A third generation of colored lenses provided a thin layer of colored opaque markings placed in a clear material. The opaque colored markings radiated from the center of the clear material in a geometric pattern.

PRIOR ART

Fuhrman U.S. Pat. No. 4,558,931 discloses a cosmetic lens blank having horizontal colored layers through which a contact lens is cut from the blank.

Wichterle U.S. Pat. No. 3,679,504 discloses a method of painting colored patterns between two hydrogel layers.

Wichterle U.S. Pat. No. 3,557,261 discloses a contact lens having two layers with a colored pattern between.

Spivack U.S. Pat. No. 3,536,386 discloses iris patterns sanwiched between two lens members.

Borowsky U.S. Pat. No. 4,576,453 discloses a contact lens having a gradient colored central area.

Negle U.S. Pat. No. 3,034,403 discloses a contact lens having an opaque central area.

Kai C. Su U.S. Pat. No. 4,553,975 discloses the use of reactive dyes to color transparent contact lenses.

Knapp U.S. Pat. No. 4,582,402 discloses a method of coloring contact lenses having an iris pattern formed by intermittent opaque markings.

U.S. Pat. Nos. (Neefe) 4,460,523 and 4,472,327 described methods of making cosmetic contact lenses wherein the lens segments are joined vertically through the lens.

SUMMARY OF THE INVENTION

A method of making a cosmetic tinted contact lens with an iris pattern and a lens made by the method. The method includes the steps of: providing a surface on a contact lens; providing a rubber printing member having a plurality of raised radially extending printing segments, the segments having a radius of curvature substantially the same as the surface of the lens on which the iris pattern is to be printed; applying a colored viscous printing ink to the surfaces of the raised radial segments; placing the raised radial segments against the surface of the contact lens; and applying sufficient pressure to the rubber printing member to deform and widen the raised radial segments thereby forcing the printing ink to be displaced, laterally on the surface of the contact lens by the outward movement which results from the deformation of the radial segments. The stamping process is repeated from 1 to 20 times to form a replica of the natural iris. The rubber printing member is made by casting in a curved metal mold having radial depressions radiating from a central pupil area.

DESCRIPTION OF THE PREFERRED EMBODIMENT

The Eye Color Change is made as follows:

A concave-convex contact lens is made by having a reflective colored layer or member positioned between the convex and concave lens surfaces. The colored layer is either a transparent color or a reflective opaque color surrounding the central pupil area. The colored member may either be a single solid color or may have multiple colors and designs such as an iris pattern, flowers or geometric art designs. The colored iris layer may be light absorbing or reflecting. Examples are carbon black for light absorbing and titanium dioxide for light reflecting.

Figure 1:
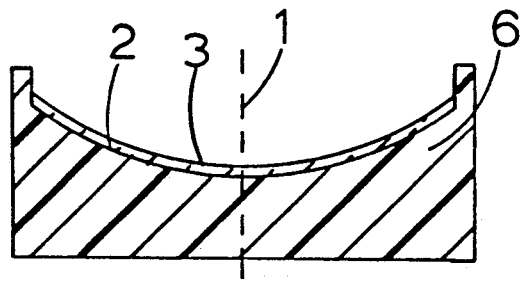
FIG. 1 shows the first casting in the spin cast mold, in section.
Figure 2:
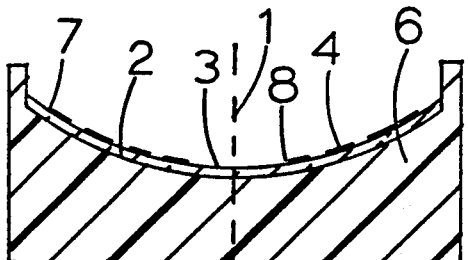
FIG. 2 shows the first casting with the reflective colorant in place, in section.
Figure 3:
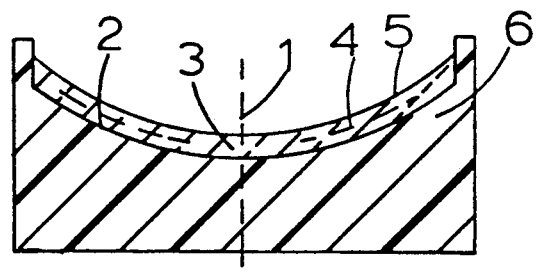
FIG. 3 shows the first and second castings with the reflective colorant between, in section.
Figure 4:
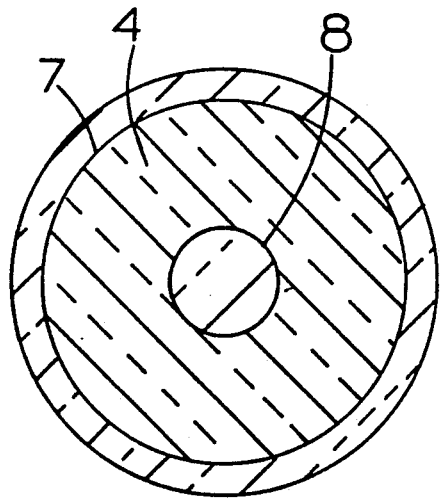
FIG. 4 shows the lens from the front with a transparent pupil and opaque reflective iris.
Figure 5:
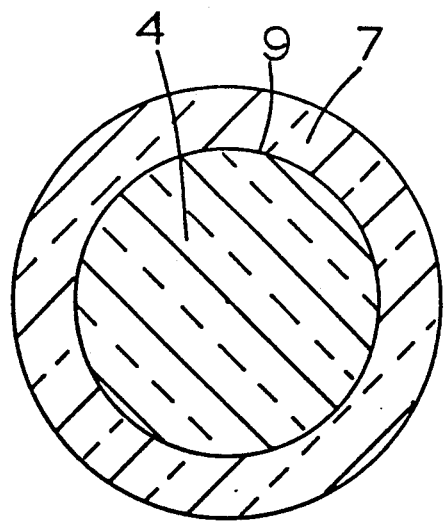
FIG. 5 shows the lens from the front with a transparent color in the central area.
Figure 6:
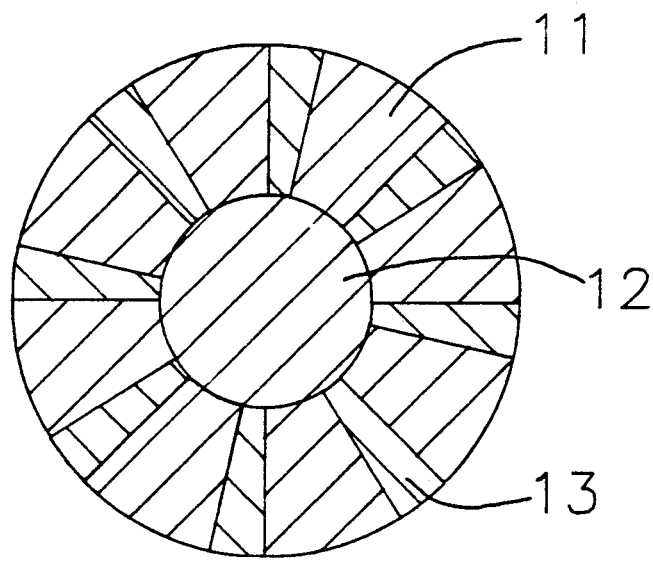
FIG. 6 shows the metal concave mold from the top.

A concave mold, FIG. 6, having radial depressions 13 radiating from the central circular pupil area 12 is provided. The concave radius of the radial depressions 13 and the mold surface are equal to or up to one (1) millimeter shorter than the concave lens radius.

Figure 7:
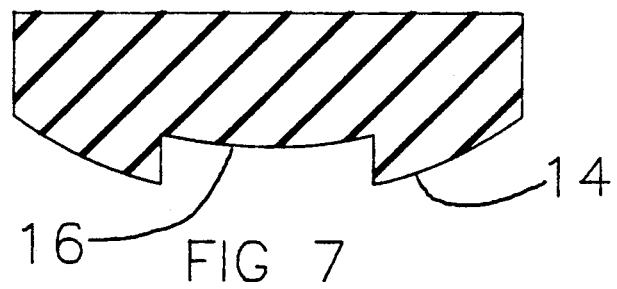
FIG. 7 shows the rubber stamp in section.

A convex rubber mold, FIG. 7, is made by casting silicone rubber in the concave metal mold of FIG. 6. The edge of the silicone stamping mold radial segments 14 FIGS. 7 and 8, form a 90° angle 15 FIG. 8.

A stamping ink is prepared from oil or water soluble dyes. The dyes may be combined with suspended pigments to form a viscus stamping ink.

Figure 8:
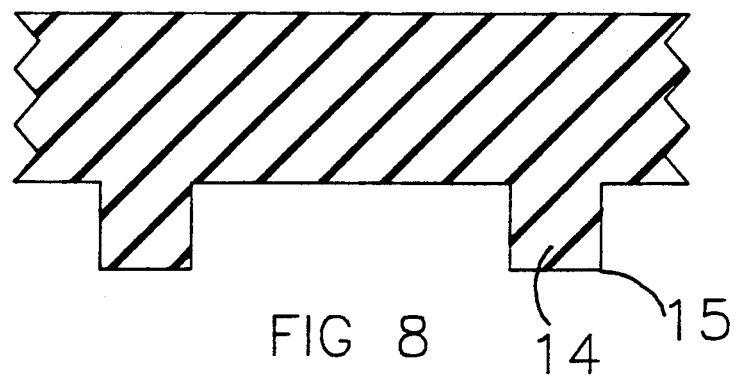
FIG. 8 shows the radial stamping segments enlarged in section.

A replica iris pattern is formed by coating the stamping surfaces of convex silicone radical segments 14, FIGS. 7 and 8, with the colored ink mixture. A concave convex contact lens is supplied.

The convex rubber radial segments 14, FIG. 7, coated with the colored ink mixture is placed on the concave lens surface. Pressure is applied to the rubber stamping member to deform the shape of the radial segments 14 FIG. 8, radiating from the central pupil area 16. This deformation and widening of the stamping surface of radial segments 14, FIG. 8, forces the colored ink outward from the rubber stamping member. This action is much like a small squeege leaving a line of liquid displaced by the outward movement of the rubber edge 15 FIG. 8. The lens is rotated a few degrees and the process is repeated from one to twenty times. The resulting irregular, overlapping radial patterns closely resemble the appearance of the natural human iris. A second lens layer is cast over the first encasing the iris pattern within the lens.

For dramatic fashion effects, bright colors in the form of flowers, stars, pinwheels, etc ... combined with light reflecting materials such as zink oxide, tin oxide, titanium dioxide and barium sulfate are used. Bright light reflecting colors such as yellow, red, blue and green are placed over a black light absorbing background.

These lenses may be produced in either soft or hard form.

The following are examples of colorants which may be used to practice the invention.

(1) Reactive Black 5 [2.7-naphthalenedisulfonic acid, 4-amino-5-hydroxy-3,6bis((4-((2-(sulfooxy)ethyl)sulfonyl)phenyl)azo)-tetrasodium salt] (CAS Reg. No. 17095-24-8);

(2) Reactive Blue 21 [copper, (29H,31H-phthalocyaninato (2-)-$N^{29}$, $N^{30}$, $N^{31}$, $N^{32}$)-,sulfo((4-((2-sulfooxy)ethyl)sulfonyl)amino) sulfonyl derivs] (CAS Reg. No. 73049-92-0);

(3) Reactive Orange 78 [2-naphtha-lenesulfonic acid, 7-(acetylamino)-4-hydroxy-3-((4-((2-sulfooxy)ethyl)sulfonyl)phenyl)azo)-[ (CAS Reg. No. 68189-39-9);

(4) Reactive Yellow 15 ]benzensulfonic acid, 4-(4,5-dihydro-4-((2-methoxy-5-methyl-4-((2-2(sulfooxy)ethyl)sulfonyl)phenyl)azo)-3-methyl-5-oxo-1H-pyrazol-1-yl)-] (CAS Reg. No. 60958-41-0);

(5) Reactive Blue No. 19 [2-anthra-cene-sulfonic acid, 1-amino-9,10-dihydro-9,10-dixo-4-((3-((2-(sulfooxy)ethyl)sulfonyl)phenyl) amino)-disodium salt] (CAS Reg. No. 2580-78-1);

(6) Reactive Blue No. 4 [2-anthra-cenesulfonic acid, 1-amino-4-3-((4,6-dichloro-s-triazin-2-yl)amino)-4-sulfoanilino)-9,10 -dihydro-9,10-dixo, disodium salt] (CAS Reg. No. 4499-01-8);

(7) C.I. Reactive Red 11 [5-((4,6-dich-loro-1,3,5-triazin-2-yl)amino)-4-hydroxy-3-(1sulfo-2-naphthalenyl)azo-2, 7-naphthalene-disulfonic acid, trisodium salt] (CAS Reg. No. 12226-08-03);

(8) C.I. Reactive Yellow 86 [1,3 -ben-zenedisulfonic acid, 4-((5-aminocarbonyl-1-ethyl-1,6--dihydro-2-hydroxy-4-methyl-6-oxo-3-pridinyl)azo)-6-(4,6-dichloro-1,2,5-triazin-2yl)amino)-,disodium salt] (CAS Reg. No. 61951-86-8); and (9) C.I. Reactive Blue 163 [tripheno-dioxazinedisulfonic acid, 6,13-dichloro-3, 10-bis((4-((4.6-dichloro-1,3,5-triazin-2-yl)amino)sulfophenyl)amino)-,tetrasodium salt] (CAS Reg. No. 72847-56-4).

(10) Light absorbers such as bone black, carbon black, Burnt Umber or finely divided charcoal.

(11) Light reflecting materials such as tin oxide, titanium oxide, zink oxide or barium sulfate.

(12) Light reflecting pigments such as for dramatic fashion effects, bright colors in the form of flowers, stars, pinwheels, etc ... , combined with light reflecting materials such as zink oxide, tin oxide, titanium dioxide and barium sulfate are used. Bright light reflecting colors such as yellow, red, blue and green are placed over a black light absorbing background.

These lenses may be produced in either soft or hard form.

The Eye Color Change lens functions as follows:

A concave-convex contact lens is made having a colored layer or member positioned between the convex and concave lens surfaces. The colored layer is either a light absorbing color or a light reflecting color surrounding the central pupil area. The colored member may either be a single color or may have multiple colors and designs such as an iris pattern, flowers or geometric art designs. The colored iris layer may also be light absorbing or light reflecting.

When the lens is placed on the eye the opaque reflective colored iris area will change the apparent color of the eye. The central pupil area and the peripheral lens area are transparent. The peripheral area is clear and colorles; the pupil area is transparent and may be clear or colored.

We claim:

1. A cosmetic contact lens to change the apparent color of the eye upon which the lens is placed made by the steps of: providing a contact lens of concave-convex form, providing a rubber printing member having a plurality of raised radial segments extending outward from the central pupil area of the printing member and having a radius of curvature substantially the same as one of the surfaces of the contact lens, applying a colored viscus printing ink to the surfaces of the raised radial segments of the rubber printing member, placing the surfaces of the rubber printing member against the surface of the contact lens having substantially the same curvature as the radial segments, applying sufficient pressure to one of the contact lens and the rubber printing member to deform and widen the raised radial segments of the rubber printing member, thereby forcing the viscus printing ink to be displaced on the surface of the contact lens by the outward movement provided by the deformation of the rubber radial segments.

2. The lens as in claim 1 wherein the rubber printing member is removed from the lens surface and the lens is rotated relative to the rubber printing member and the raised radial segments of the rubber printing member are replaced on the lens surface and pressure again applied, repeating the rotating of the lens and printing from one to twenty times to form a replica of the natural iris on the surface of the contact lens.

3. A method of making a contact lens having a printed replica of the natural iris by the steps of: providing a curved rubber stamp having radial segments extending outward from the central pupil area, applying a colored viscus stamping ink to the curved surfaces of the radial rubber stamp segments, placing the curved surfaces of the radial rubber stamp segments against the surface of the contact lens having substantially the same curvature as the radial segments, applying sufficient pressure to deform the shape of the radial rubber stamp segments to displace the viscus ink outward over the contact lens surface, removing the rubber stamp from the lens surface, rotating the lens and replacing the curved surfaces of the radial rubber stamp segments on the lens surface, and applying pressure to again deform the shape of the radial rubber stamp segments to displace the viscus ink outward to thereby form a printed replica o the natural iris.

4. A method of making a cosmetic tinted lens by printing an iris pattern on the iris portion of the contact lens by the steps of: providing a curved metal mold having radial depressions radiating from a central pupil area, casting a rubber stamping member having radial segments in the metal mold, applying a colored stamping ink to the surfaces of the radial segments of the rubber stamping member, applying the radial segments of the rubber stamping member aginst the surface of a first contact lens layer having substantially the same curvature as the radial segments, applying pressure to deform the shape o the radial segments of the rubber stamping member, removing the rubber stamping member from the lens surface, rotating the contact lens relative to the rubber stamping member and repeating the printing process from one to twenty times to form a printed pattern resembling the appearance of the natural iris, casting a second contact lens layer over the first contact lens layer thereby encasing the iris pattern within the lens.

* * * * *